Sept. 21, 1954     H. H. TURNER     2,689,633
ONE-WAY CLUTCH
Filed Aug. 10, 1949                                                            2 Sheets—Sheet 1
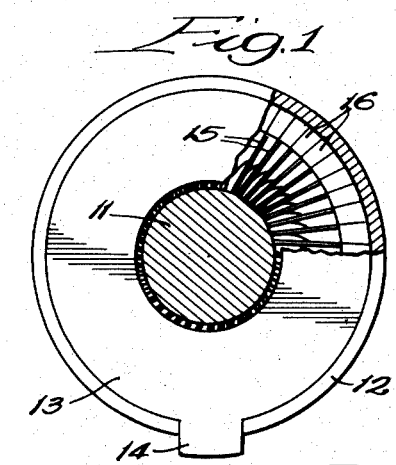
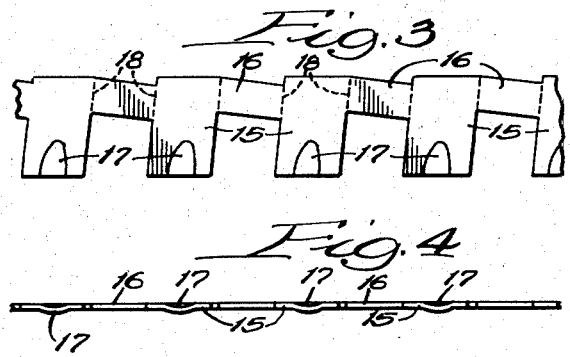
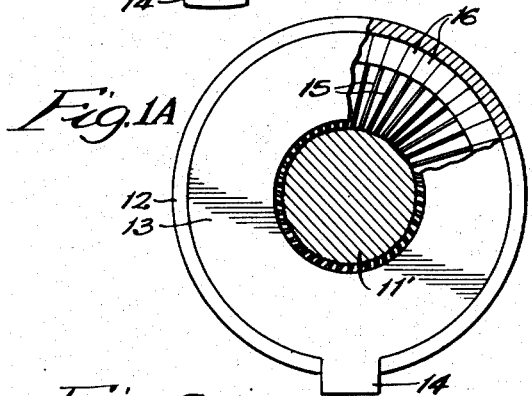
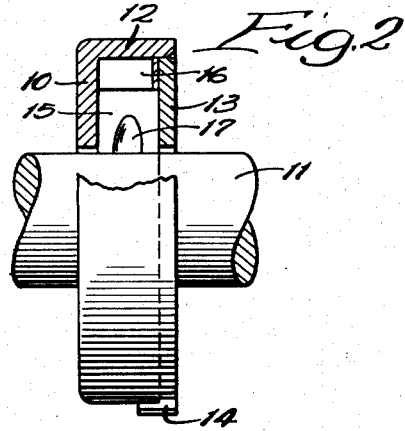
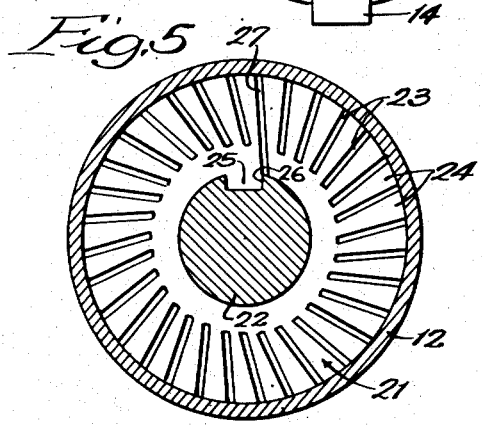
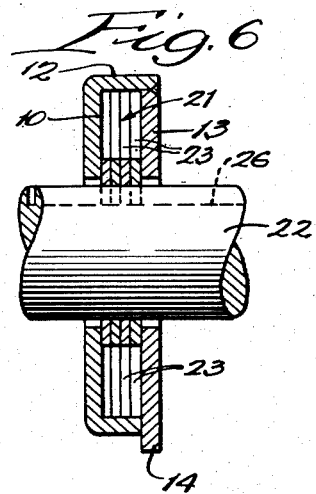
INVENTOR:
Harold H. Turner,
BY Dawson, Orms, Brittan, Spangenberg,
ATTORNEYS.

Sept. 21, 1954    H. H. TURNER    2,689,633
ONE-WAY CLUTCH
Filed Aug. 10, 1949    2 Sheets-Sheet 2
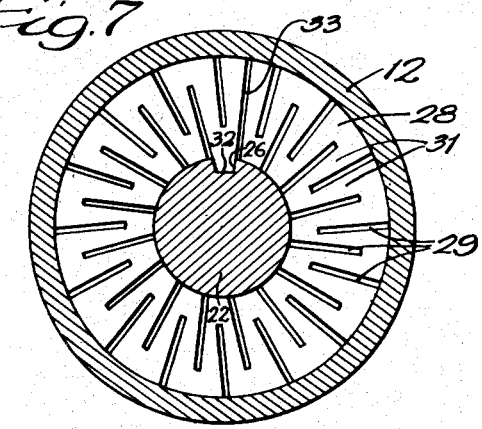
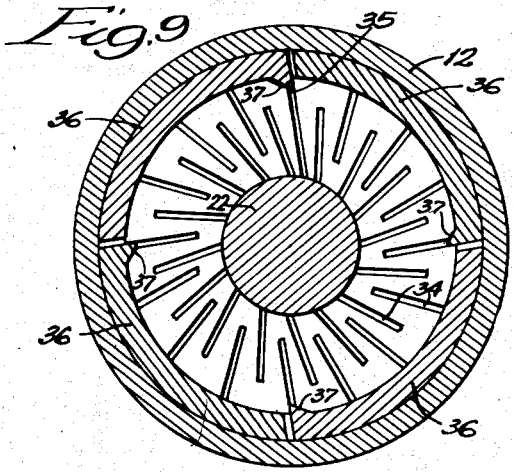
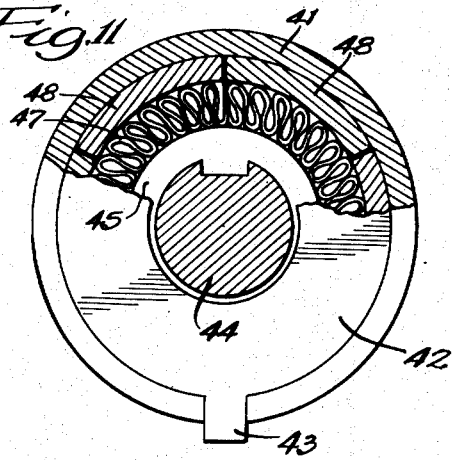
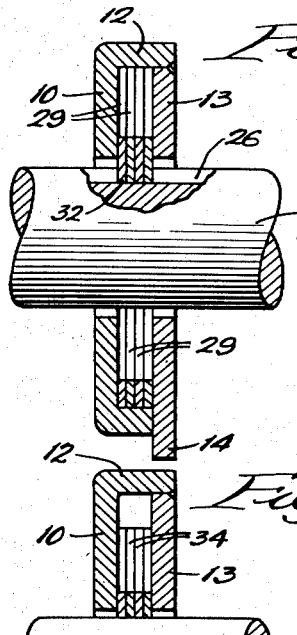
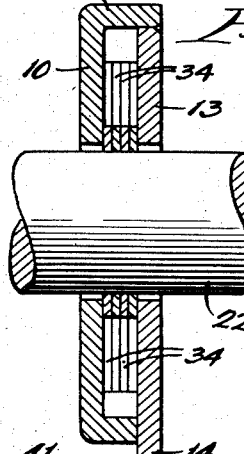
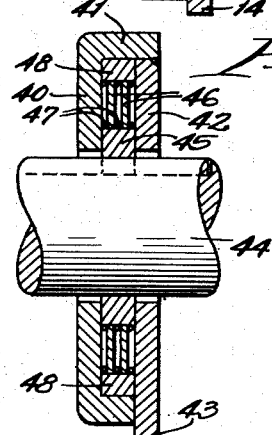
INVENTOR:
Harold H. Turner,
BY Dawson, Orms, Brittany Spangenberg,
ATTORNEYS.

Patented Sept. 21, 1954

2,689,633

UNITED STATES PATENT OFFICE 2,689,633

ONE-WAY CLUTCH

Harold H. Turner, Rockford, Ill., assignor, by mesne assignments, to Borg-Warner Corporation, Chicago, Ill., a corporation of Illinois Application August 10, 1949, Serial No. 109,597

7 Claims. (Cl. 192—41)

This invention relates to one way clutches and more particularly to clutches of the tiltable sprag or gripper type.

Heretofore tiltable sprag or gripper clutches have been made with shaped sprags or grippers operating between substantially smooth races and have proved highly effective. It has also been proposed to make such clutches with relatively thin sprags or grippers formed of sheet metal or the like. In these constructions, however, it has been extremely difficult to assemble the sprags or grippers and to control them during operation.

It is one of the objects of the present invention to provide a one way clutch in which the sprags or grippers are integrally formed from a metal strip and are connected by integral relatively flexible portions which are preferably located at the ends of the sprag portions. With this construction the gripper assembly can be formed very inexpensively, can easily be assembled and provides for an effective control of the sprag or gripper portions in operation.

Another object is to provide a one way clutch in which the sprags or grippers are formed from portions of a sheet metal strip shaped to provide straight sprag portions connected by relatively narrow integral connecting portions. In one desirable construction the strip is folded so that the sprag portions lie in face to face relationship in annular array with the narrow connecting portions between them, and in another desirable construction the strip is annular and is slotted to separate it into a series of straight sprag portions integrally connected together.

Still another object is to provide a one way clutch in which the gripper assembly is connected to one of the races at one point and is separated adjacent the point of connection. This construction provides a wrapping action of the gripper assembly to improve its operation.

Still another object is to provide a one way clutch in which friction shoes are mounted between the gripper assembly and one of the races so that wear on the gripper assembly is minimized.

The above and other objects and advantages of the invention will be more readily apparent when read in connection with the accompanying drawings, in which—

Figure 1 is a side view of a one way clutch embodying the invention with parts cut away and in section;

Figure 1A is a view similar to Figure 1 showing a slightly modified construction;

Figure 2 is a partial section at right angles to Figure 1;

Figure 3 is a developed view of the gripper assembly before folding;

Figure 4 is an edge view of Figure 3;

Figure 5 is a view similar to Figure 1 of an alternative construction;

Figure 6 is a section at right angles to Figure 5;

Figure 7 is a view similar to Figure 5 of still another clutch construction;

Figure 8 is a section at right angles to Figure 7;

Figure 9 is a view similar to Figure 5 of still another clutch construction;

Figure 10 is a section at right angles to Figure 9;

Figure 11 is a view similar to Figure 5 of still another clutch construction; and Figure 12 is a section at right angles to Figure 11.

The clutch assembly shown in Figures 1 and 2 comprises an outer cup shaped housing 10 to fit rotatably on a shaft 11 and which is formed with a circumferential flange 12 defining an outer cylindrical race. In the construction shown the shaft 11 itself forms the inner race, although, if preferred, a separate annular race could be provided for mounting on the shaft. The housing 10 is closed by a cover plate 13 having a projection 14 thereon fitting into a notch in the flange 12 to provide a complete closed assembly.

A gripper assembly is mounted in the housing between the outer race 12 and the shaft 11 to connect them for rotation in one direction. As best seen in Figures 3 and 4, the gripper assembly is formed of a strip of sheetmetal cut to provide a series of substantially flat sprag portions 15 connected by relatively narrow connecting portions 16. The sprag portions extend the full width of the strip and are preferably corrugated at one end as indicated at 17 to stiffen them and to assist in spacing them properly in the assembly. The connecting portions 16 extend at a slight angle to the length of the strip, and the sprag portions are at an acute angle to a line perpendicular to the strip length so that when the strip is folded on the dotted lines 18 connecting the sprag and connecting portions the sprag portions will lie at an acute angle to radii through them.

In forming the gripper assembly, a strip as shown in Figure 3 may be cut or punched in any desired manner and may then be folded into an annulus of a size to fit into the housing 10, as shown. When so assembled the sprag portions will lie at acute angles to radii through them between the inner and outer race surfaces and will be connected by the relatively thin and flexible connecting portions 16 at the outer edges of the sprag portions. When so assembled the corrugations 17 not only tend to stiffen the sprag portions but also interfit as indicated in Figure 1 to assist in maintaining the sprag portions properly spaced between the races. The corrugations also provide a greater circumferential width at the bases of the sprag portions to limit any tendency of the sprag portions to snap over center.

In operation when the outer race 12 tends to turn clockwise as seen in Figure 1 relative to the shaft 11 the sprag portions will tilt due to flexing of the connecting portions 16 to permit relatively free rotation of the housing. When the housing or outer race tends to turn in the opposite direction the sprag portions will tend to move to a radial position and will grip the races to hold them against relative rotation. The connecting portions 16 are sufficiently resilient to assist in engaging the sprag portions during different operations but will yield to permit tilting of the sprag portions during overrunning.

In the modification shown in Figure 1A the corrugations 17 are omitted and the inner race 11' is serrated to receive the inner ends of the sprag portions. This prevents any slipping of the sprag portions over the inner race and, in effect, keys them to the inner race.

In the construction shown in Figures 5 and 6 the housing parts may be identical with those of Figures 1 and 2 and are indicated by the same reference numerals. In this construction the gripper assembly is formed by one or more annular plates 21 of a size to fit between the outer race 12 and a shaft 22. The plates are formed with a series of slots 23 extending inward from the outer edge thereof and terminating short of the inner edge to divide the plates into a series of straight sprag portions 24. The slots and sprag portions extend generally radially but preferably lie at an acute angle to radii through them so that the sprag portions will tend to tilt during operation.

Preferably each of the plates 21 is provided with a key projection 25 fitting into a keyway 26 in the shaft 22 to hold the plates against rotation relative to the shaft. One of the slots, as shown at 27, at one side of the key 25 preferably extends completely across the strip to separate it so that it can provide a degree of wrap down action.

In operation when the outer race 12 tends to turn counter-clockwise relative to the shaft 22, as seen in Figure 5, the sprag portions 24 tend to tilt to the left to shorten their effective radial length and at the same time the entire strip tends to wrap down on the inner shaft to permit overrunning of the housing. Upon rotation in the opposite direction the sprag portions 24 tend to straighten radially and the strip tends to spread to bind against the outer race so that the parts are connected for rotation together. The strip is sufficiently resilient so that the narrow inner portions thereof which connect the sprag portions can yield to permit the necessary tilting of the sprag portions during these operations.

Figures 7 and 8 illustrate a modification of the constructions of Figures 5 and 6 in which the housing and shaft parts are identical and are indicated by the same reference numerals. In this construction the gripper assembly is formed of an annular strip 28 having a series of slots 29 therein extending alternately from the outer and inner edges of the strip. The slots divide the strip into a series of straight gripper portions 31 which preferably lie at an acute angle to radii through them and which are alternately connected at the inner and outer edges of the strip by relatively narrow connecting portions. The strip is formed with a key projection 32 fitting into the keyway 26 in the shaft and has one of the slots, as shown at 33, at one side of the key extending completely across its width.

This construction operates in substantially the same manner as that in Figures 5 and 6 but due to the staggering of the slots provides somewhat more flexibility between the sprag portions.

Figures 9 and 10 illustrate still another construction in which the housing and shaft parts are identical with those of Figures 5 and 6 and are indicated by the same reference numerals. In this construction the gripper assembly is formed by an annular plate formed with slots 34 extending alternately from its inner and outer edges as in Figures 7 and 8 and having one slot 35 extending completely across its width. The gripper assembly may or may not be keyed to the inner shaft 22 as desired.

Between the gripper assembly and the outer race there is provided a series of friction shoes 36 which are adapted frictionally to engage the outer race and which are preferably formed with inwardly extending projections 37 connecting them to the gripper assembly to limit relative rotation therebetween.

When the outer race 12 turns counterclockwise relative to the center shaft, the sprag portions of the gripper assembly tend to tilt to shorten their effective radial length so that the friction shoes will not be pressed against the outer race. It will be noted that in this direction the friction shoes are fastened to the gripper assembly at their leading edges so that they tend to be swung inward out of contact with the outer race. Upon rotation in the opposite direction the shoes are connected to the gripper assembly at their trailing edges so that they tend to be self-actuating and tend to tilt the sprag portions to the right so that the sprag portions will press the shoes tightly against the outer race. In this operation the races are connected by the gripper assembly and the friction shoes for transmission of torque therebetween.

Figures 11 and 12 illustrate an alternative construction including a housing 40, similar to the housing 10 and having a flange 41 forming an outer race. The housing may be closed by a plate 42 having a key projection 43 fitting into a notch in the flange 41. A shaft 44 extends through the housing and has an inner race 45 keyed thereto and providing an external cylindrical surface.

Between the races 41 and 45 a gripper assembly is mounted which is formed by a series of spacer plates 46 between which are mounted elongated metal strips of wire or the like 47. As best seen in Figure 11, the strips 47 are sinuously formed to provide substantially straight sprag portions extending at angles to radii through them and connected at their inner and outer ends by sharply rebent connecting portions. In this construction the connecting portions will be more flexible than the sprag portions so that the sprag portions can move angularly relative to each other.

Between the strips 47 and the outer race there are arranged a series of friction shoes 48. With this construction when the outer race 41 tends to turn counter-clockwise relative to the inner race 45, the sprag portions of the strips 47 will deflect to shorten their effective radial length so that the shoes 48 can move away from the outer race and permit it to turn. Upon rotation in the opposite direction, the sprag portions of the strips 47 tend to straighten radially to press the shoes 48 tightly into engagement with the outer race thereby to connect the inner and outer races. The strips may be sufficiently resilient normally to press the friction shoes lightly against the outer race to provide the necessary initial friction for operation.

While several embodiments of the invention have been shown and described in detail herein, it will be understood that they are illustrative only and are not to be taken as a definition of the scope of the invention, reference being had for this purpose to the appended claims.

What is claimed is:

1. A one way clutch comprising inner and outer coaxial races, and a gripper assembly lying between the races to connect them for rotation in one direction formed of a relatively thin substantially flat annular strip formed with a series of spaced slots alternately extending inward from its outer edge and outward from its inner edge to divide the strip into a series of straight sprag portions alternately connected at the inner and outer edges of the strip.

2. A one way clutch comprising inner and outer coaxial races, and a gripper assembly lying between the races to connect them for rotation in one direction formed of a relatively thin substantially flat annular strip formed with a series of spaced slots alternately extending inward from its outer edge and outward from its inner edge to divide the strip into a series of straight sprag portions alternately connected at the inner and outer edges of the strip, means connecting the strip at one point to one of the races and one of the slots adjacent said point extending completely across the strip.

3. A one way clutch comprising inner and outer coaxial races, a gripper assembly lying between the races formed of a thin strip shaped to provide an annular series of substantially straight sprag portions extending at acute angles to radii through them and connected adjacent their ends by integral relatively flexible portions, and a series of arcuate friction segments between the gripper assembly and one of the races.

4. A one way clutch comprising inner and outer coaxial races, a gripper assembly lying between the races formed of a thin strip shaped to provide an annular series of substantially straight sprag portions extending at acute angles to radii through them and connected adjacent their ends by integral relatively flexible portions, a series of arcuate friction segments between the gripper assembly and one of the races, and means connecting the friction segments to the gripper assembly to limit relative circumferential movement therebetween.

5. A one way clutch comprising inner and outer coaxial races, a gripper assembly lying between the races formed of a thin strip shaped to provide an annular series of substantially straight sprag portions extending at acute angles to radii through them and connected adjacent their ends by integral relatively flexible portions, and a series of arcuate friction segments between the gripper and the outer race.

6. A one way clutch comprising inner and outer coaxial races, a gripper assembly between the races formed of a thin flat strip shaped to provide a series of straight sprag portions connected adjacent their ends by integral relatively narrow portions, the sprag portions lying in annular array between the races, and a series of friction shoes between the ends of the sprag portions and one of the races.

7. A one way clutch comprising inner and outer coaxial races, a gripper assembly between the races formed of a thin flat annular strip formed with a series of generally radially extending slots dividing it into a series of straight sprag portions integrally connected adjacent their ends, and a series of friction shoes between the ends of the sprag portions and one of the races.

References Cited in the file of this patent

UNITED STATES PATENTS

| Number | Name | Date |
| --- | --- | --- |
| 1,980,185 | Chilton | Nov. 13, 1934 |
| 2,075,130 | Osterholm | Mar. 30, 1937 |
| 2,224,935 | Schultz | Dec. 17, 1940 |

FOREIGN PATENTS

| Number | Country | Date |
| --- | --- | --- |
| 683,310 | Germany | Nov. 3, 1939 |